Nov. 27, 1951        G. B. MORNIK        2,576,804
POWDER GUN
Filed May 31, 1949        4 Sheets-Sheet 1
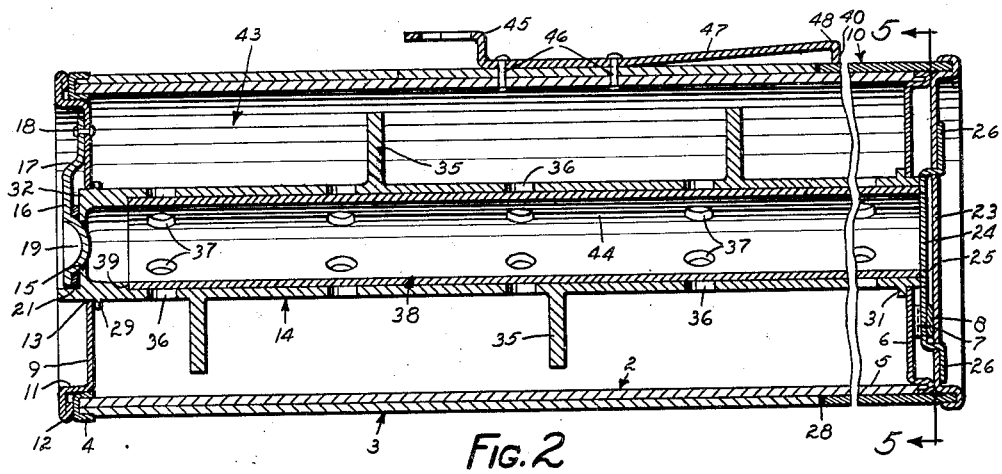
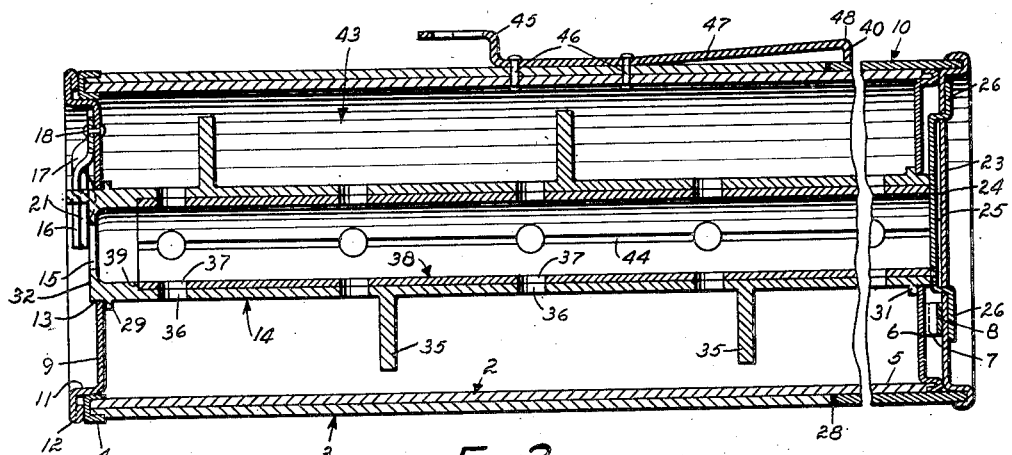
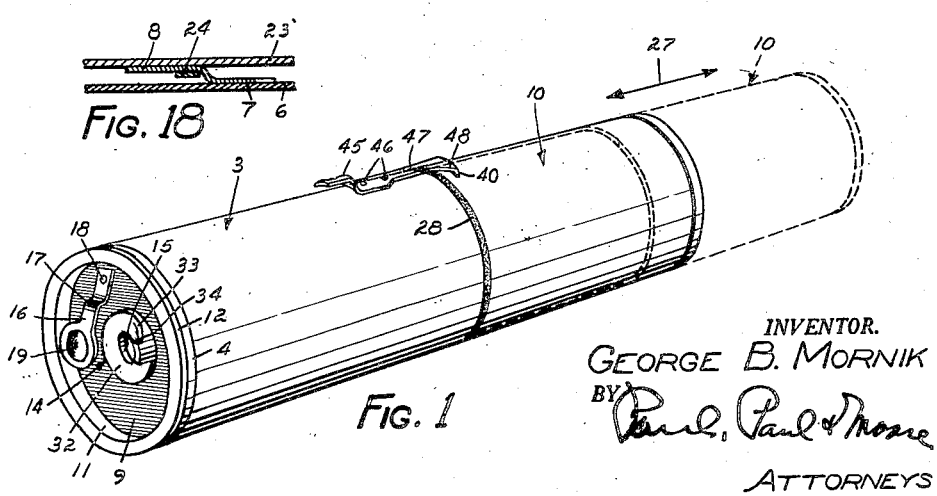
INVENTOR.
GEORGE B. MORNIK
ATTORNEYS Nov. 27, 1951 G. B. MORNIK 2,576,804
POWDER GUN
Filed May 31, 1949 4 Sheets-Sheet 2

INVENTOR.
GEORGE B. MORNIK
BY
ATTORNEYS

Nov. 27, 1951  G. B. MORNIK  2,576,804
POWDER GUN

Filed May 31, 1949  4 Sheets-Sheet 3

INVENTOR.
GEORGE B. MORNIK
BY Paul, Paul & Moore
ATTORNEYS

Nov. 27, 1951 G. B. MORNIK 2,576,804
POWDER GUN
Filed May 31, 1949 4 Sheets-Sheet 4

INVENTOR.
GEORGE B. MORNIK
BY
Paul, Paul & Moore
ATTORNEYS

Patented Nov. 27, 1951

2,576,804

UNITED STATES PATENT OFFICE 2,576,804

POWDER GUN

George B. Mornik, Mounds View Township, Ramsey County, Minn.

Application May 31, 1949, Serial No. 96,191

20 Claims. (Cl. 169—33)

This invention relates to new and useful improvements in powder or dust guns and more particularly to such a gun capable of expelling or discharging a liberal quantity of powder at each stroke of its operating member, whereby the gun may be utilized for smothering and extinguishing fires, when loaded with a suitable fire extinguishing powder.

Attempts have heretofore been made to provide a powder gun for spraying powder onto a fire for the purpose of extinguishing the fire, but to the best of my knowledge, none of these have been provided with means for positively agitating the powder within the powder chamber, when the gun is initially operated, whereby should the powder become compacted in the powder chamber as a result of jarring or tapping the gun, or from other causes, the operator may have difficulty in quickly expelling the powder from the gun, which may be necessary in case of a fire.

A powder gun designed for extinguishing fires, should be so constructed that upon initial operation of its operating member, the gun is conditioned to expel a full charge of powder onto the fire for each stroke of the operating member, and will continue so to do as long as there is an adequate supply of powder in the powder chamber, and regardless of the position in which the gun may be held.

The novel dust gun herein disclosed is the result of long and tedious research and experimental work in an attempt to provide a powder gun of this general type wherein all of the objectionable features now usually inherent in apparatus of this general type have been eliminated, resulting in the production of a powder gun embodying all of the desirable features required in such a device to render it highly efficient and practical, and whereby a fire may be quickly extinguished by a minimum number of strokes of the operating member of the gun.

An important feature of the present invention therefore is to provide a powder gun particularly applicable for use to extinguish fires which, when not in use, is sealed to prevent leakage of powder from the gun, and also to prevent moisture from entering therein, and said gun being so constructed that the instant it is picked up, and the operator imparts one or more rotary twists to the operating member of the gun, the gun is rendered ready for immediate use whereby the powder contained in the gun may be quickly discharged onto a fire, thereby to extinguish the fire before it gets out of control.

A further object is to provide a powder gun of the class disclosed comprising a powder storage chamber having a propulsion tube provided at one end with a normally sealed discharge orifice, and having means in its wall whereby communication may be quickly established between the propulsion tube and the powder chamber to admit free flow of powder from the powder chamber into the propulsion tube, thereby to assure the operator that the gun will expel a maximum charge of powder for each stroke of the operating member.

A further object is to provide a powder gun comprising a suitable cylinder having a wall at one end provided with a discharge orifice, and means being provided for sealing the discharge orifice against leakage, when the gun is not in use, and an operating member being telescopically engaged with the opposite end of the cylinder which may be conveniently manipulated, first to break the sealing means of the gun, and next to automatically open the discharge orifice; after which the operating member may be conveniently manipulated to expel or spray powder from the gun.

A further object is to provide a powder gun of the class described comprising a cylinder having means therein providing a storage chamber for the powder, and means also being provided whereby the air drawn into the cylinder upon the suction stroke of the operating member, enters through the powder discharge orifice at the front end of the gun and thoroughly disperses the powder within the gun so that when the operating member is thrust forwardly on the pressure stroke, a maximum quantity of powder is expelled from the discharge orifice of the gun onto the fire or other object to be sprayed with powder.

A further object is to provide a powder gun comprising a cylinder having a propulsion tube disposed therein and extending from end to end thereof with its wall spaced inwardly from the wall of the cylinder to provide an annular powder storage chamber, and the propulsion tube having a plurality of powder circulating passages in its wall which are normally closed by a suitable sleeve member mounted within the propulsion tube, said sleeve member having an operative connection with the operating member of the gun whereby it may be relatively rotated to move the powder circulating passages or apertures in its wall into or out of registration with the openings in the wall of the propulsion tube, thereby to establish communication between the powder storage chamber and the interior of the propulsion tube and sleeve member, whereby subsequent manipulation of the operating member will cause the powder to discharge from the gun at maximum flow.

A further object is to provide a powder gun of the class described having means for agitating the powder in its storage chamber, whereby a full charge of powder may be discharged from the gun upon each stroke of the operating member.

A further object is to provide a powder gun of the class described comprising a cylinder having an annular shoulder on its periphery, and being provided with an end wall having a discharge orifice therein which is normally closed by a fracturable element, and the connection between the inner end of the operating member and the shoulder on the casing being normally sealed by an annular fracturable sealing strip, and a member being movably mounted on the exterior of the cylinder and carrying at one end one or more cutting elements adapted to fracture the sealing element closing the discharge orifice, and said member simultaneously causing a second cutting element to engage and break the annular seal between the shoulder on the cylinder and the operating member, when the operator initially imparts relative rotary movement to said movably mounted member, thereby to enable the operator to quickly free the operating member and simultaneously open the discharge orifice whereby the gun may be immediately operated to discharge powder therefrom.

A further object of the invention is to provide a gun of the type described wherein fresh air is drawn into the interior of the gun casing from the atmosphere through the discharge orifice, whereby the powder is continually being dispersed within the powder chamber at each stroke of the operating member, thereby causing the air discharged from the gun to be thoroughly laden or saturated with the powder to assure maximum results.

Other objects of the invention reside in the novel means provided for quickly opening the discharge orifice of the gun by a slight rotary movement of the operating member upon the cylinder, when the operator initially picks up the gun whereby the gun is always ready for immediate use; in the provision of means whereby the discharge orifice may be instantly closed when the gun is no longer to be used; in the provision of a plurality of radially disposed prongs or fingers on the wall of the propulsion tube adapted to agitate the powder in the powder storage chamber, when the tube is relatively rotated with respect to the gun casing, and in the provision of such a gun which is extremely simple and inpensive in construction, whereby it may be manufactured in quantity production at low cost.

These and other objects of the invention and the means for their attainment will be more apparent from the following description taken in connection with the accompanying drawings.

In the accompanying drawings there has been disclosed a structure designed to carry out the various objects of the invention, but it is to be understood that the invention is not confined to the exact features shown, as various changes may be made within the scope of the claims which follow.

In the drawings:

Figure 1 is a perspective view of my novel powder gun showing the discharge orifice open;

Figure 2 is a longitudinal sectional view on the line 2—2 of Figure 6, showing the gun in its normal position with the discharge orifice sealed against leakage, and also showing the sleeve member positioned to close the passages between the interior of the propulsion tube and the powder storage chamber in the cylinder;

Figure 3 is a view similar to Figure 2, but showing the discharge orifice open, and also showing the sleeve member within the propulsion tube rotated to establish free flow of powder from the powder chamber into the propulsion tube;

Figure 5:
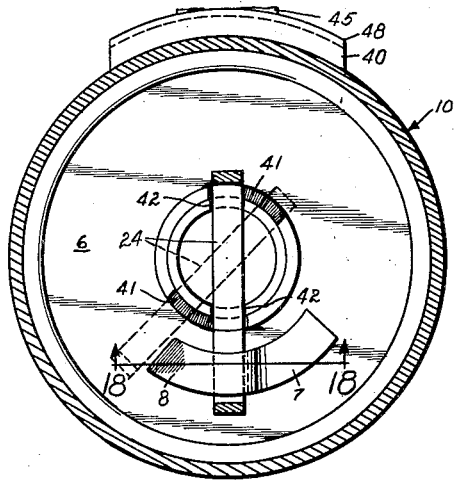
Figure 6:
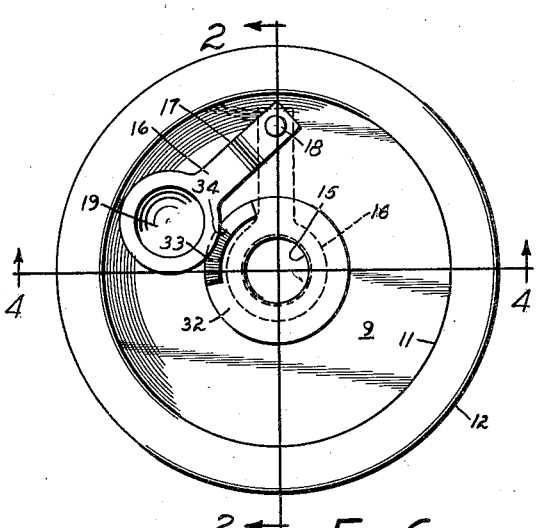
Figure 4:
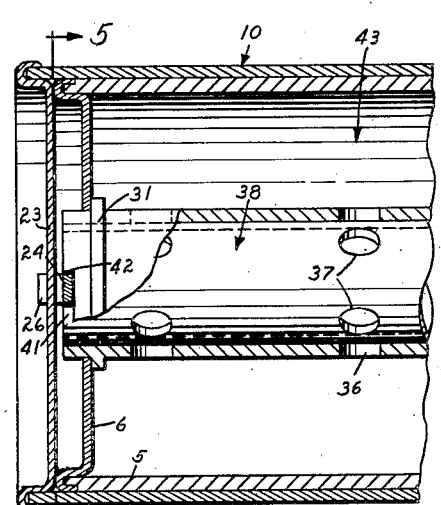
Figure 4 is a longitudinal sectional view on the line 4—4 of Figure 6.
Figure 7:
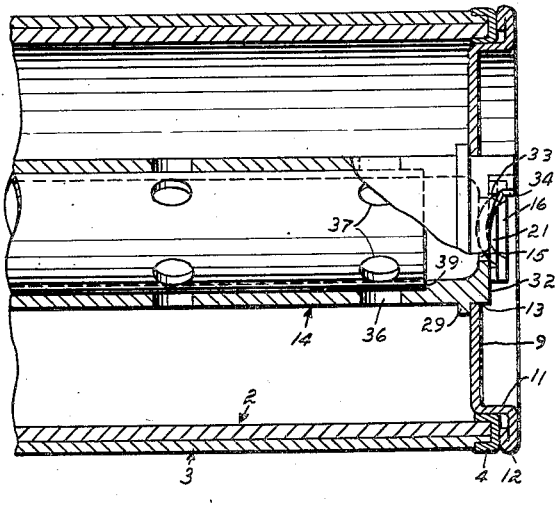
Figure 8:
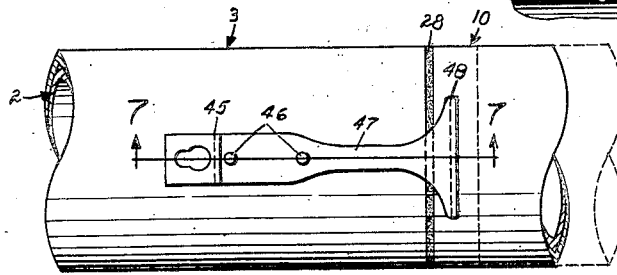
Figure 10:
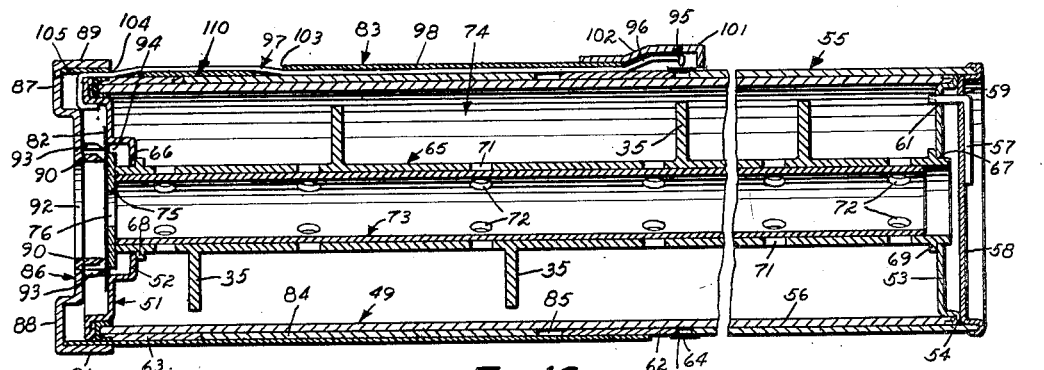
Figure 11:
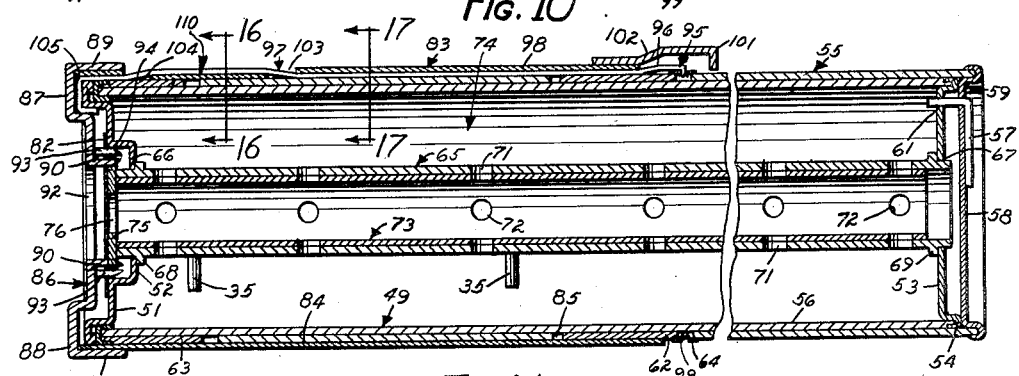
Figure 12:
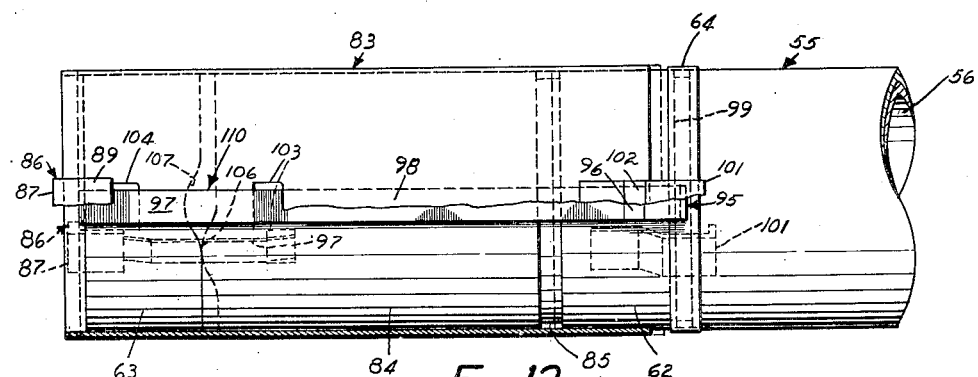
Figure 16:
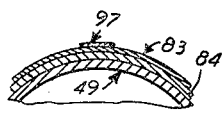
Figure 17:
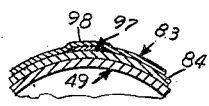
Figure 14:
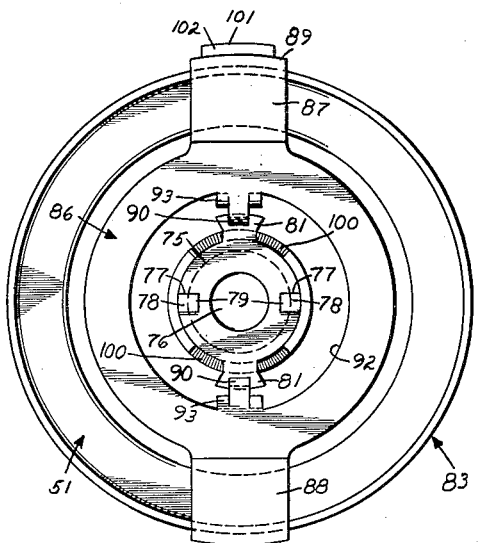
Figure 13:
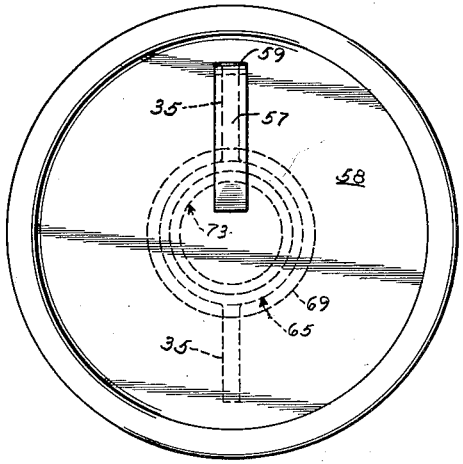
Figure 15:
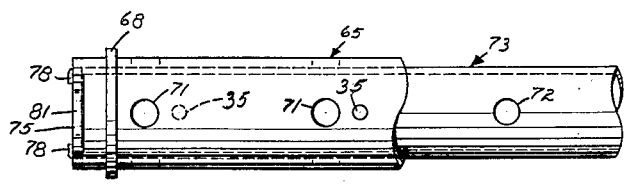
Figure 9:
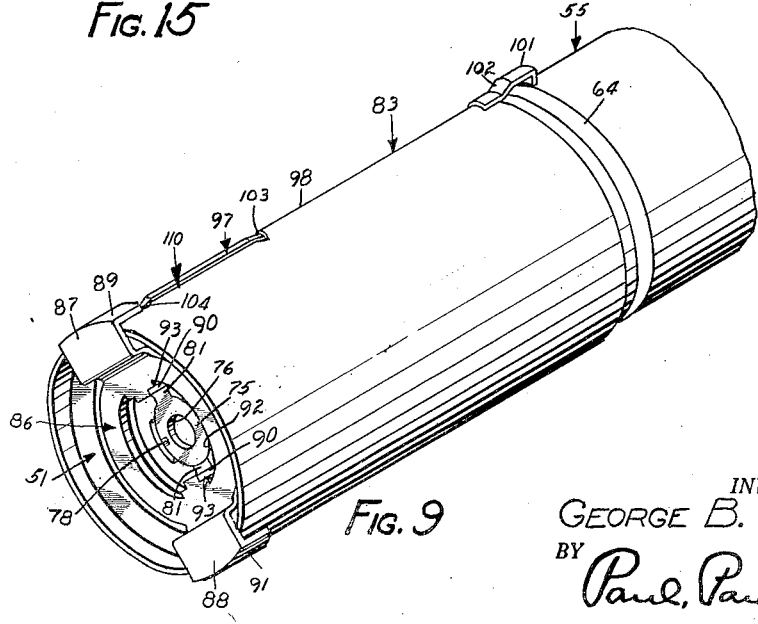

Figure 5 is a cross sectional view on the line 5—5 of Figures 2 and 4, showing the means provided on the rear end wall of the cylinder for relatively rotating the sleeve member and propulsion tube to open or close the openings in the wall of the propulsion tube upon initial relative rotary movement of the operating member, and also illustrating the clip for locking the operating member against axial movement, when in its normal inoperative position, and whereby the holes in the propulsion tube are closed;

Figure 6 is a view showing the discharge end of the gun with the discharge orifice open;

Figure 7 is a detail sectional view on the line 7—7 of Figure 8, showing a means to facilitate suspending the gun from a suitable support, and also showing the means for limiting inward movement of the operating member when being operated;

Figure 8 is a top view of Figure 7;

Figure 9 is a perspective view illustrating a gun of slightly different construction;

Figure 10 is a longitudinal sectional view on the line 10—10 of Figure 14, showing the discharge orifice sealed;

Figure 11 is a view similar to Figure 10, showing the parts operated to open the discharge orifice, and also whereby the seal between the operating member and the annular shoulder on the casing is broken to render the gun ready for use;

Figure 12 is a top view of one end of Figure 10, shown in dotted lines the cam means for actuating the cutting elements which sever the sealing means to render the gun ready for use;

Figure 13 is a view looking at the rear end of the gun upon which the operating member is mounted;

Figure 14 is a view looking at the discharge or front end of the gun;

Figure 15 is a fragmentary view of one end of the propulsion tube to illustrate the relationship between the dust passages in the walls of the propulsion tube and sleeve member, and also showing the powder agitating prongs or fingers secured to the wall of the propulsion tube;

Figure 16 is a fragmentary view on the line 16—16 of Figure 11;

Figure 17 is a view similar to Figure 16, taken on the line 17—17 of Figure 11; and Figure 18 is a detail sectional view on the line 18—18 of Figure 5, showing the clip for locking the operating member in its normal inoperative position, as when the gun is not in use.

Main cylinder

The novel powder gun herein disclosed is illustrated in its preferred form in Figures 1 to 8, inclusive, and comprises a main cylinder 2 shown having an outer casing 3 secured to the forward end thereof, whereby it constitutes in effect an integral part of the cylinder. The casing 3 is shown secured to the front or discharge end of the cylinder by an annular member 4 of U-shaped cross section which embraces the contiguous front edges of the cylinder and casing with sufficient pressure to retain the member 4 thereon. The cylinder and outer casing 2 and 3, respectively, may be made of any desired material suitable for the purpose. If made of plastic material, the cylinder 2 and outer casing member 3 may be formed or molded in one piece to simplify construction and thus reduce the manufacturing cost.

The rear end portion 5 of the cylinder 2 is extended beyond the rear end of the casing 3 to provide a suitable support for a cylindrical operating member, generally designated by the numeral 10. The rearward extension 5 of the cylinder is closed by an end wall 6 having its marginal edge suitably secured to the end of the cylinder 5 in leaktight relation, as will be understood by reference to Figures 2 and 3. An abutment clip, generally designated by the numeral 7, is secured to the end wall 6 of the cylinder and has a resilient end portion 8 spaced outwardly from the adjacent end wall 6 of the cylinder, as best shown in Figure 18.

The forward end of the cylinder 2 is normally closed by a suitable closure 9, offset at 11 to provide a forwardly spaced radial flange 12 adapted to be seated against the end of the cylinder, when the offset cylindrical portion is frictionally pressed into the open end of the cylinder to close it. A centrally disposed opening 13 is provided in the front wall or closure 9 of the cylinder adapted to receive and rotatably support one end of a propulsion tube, generally designated by the numeral 14. The propulsion tube has a discharge orifice 15 which is normally closed by a suitable closure 16 provided at one end of an arm 17 pivoted at 18 to the end wall 9 of the cylinder, as best illustrated in Figure 6. The closure 16 has an inwardly recessed portion 19 adapted to partially enter the discharge orifice 15 and to provide means for supporting a suitable gasket or sealing element 21, as indicated in Figure 2. The propulsion tube will hereinafter be described in detail.

*Operating member*

The operating member 10 is best illustrated in Figures 2 and 3, and comprises a cylindrical member mounted for sliding movement on the rearward extension 5 of the cylinder. The operating member has an end wall 23 fixed thereto which carries a bar 24 on its inner side spaced inwardly from the end wall 23 to provide a gap 25 between the bar 24 and the end wall 23 adapted to receive the resilient end portion 8 of the locking clip 7, as illustrated in Figures 2 and 18. The bar 24 may be secured to the end wall 23 by inserting its end portions through suitable slots provided in said end wall and outwardly bending the end portions 26 of the bar and fixedly securing them to said end wall, as will be understood by reference to Figures 2 and 3. If desired, other means may be employed for securing the bar 24 to the end wall 23.

The operating member 10, as hereinbefore stated is mounted for reciprocal movement on the end portion 5 of the cylinder, as indicated by the arrow 27 in Figure 1. When the operating member 10 is in its normal inoperative position, its forward end abutingly engages the annular sealing element 28 seated against the shoulder formed by the end of the outer casing 3, as shown in Figures 2 and 3.

*Propulsion tube*

Another important feature of the novel invention herein disclosed resides in the construction of the means for controlling the discharge of powder or dust from the gun when the operating member 10 is manipulated.

Such means is shown comprising the propulsion tube 14, which, it will be noted by reference to Figures 2 and 3, has its front and rear ends rotatably supported respectively in the front 9 and the rear end wall 6 of the cylinder. Annular shoulders 29 and 31 are provided on the propulsion tube to prevent endwise movement thereof. The front end of the propulsion tube projects through the opening 13 in the closure plate 9, and, as previously stated, has a discharge orifice 15 which normally is closed by the pivotally mounted member 16, shown in Figure 6.

The projecting end portion 32 of the front end of the propulsion tube is provided with a cam face 33 having an abutment shoulder 34 at one end adapted to engage the arm 17 of the closure 16, and swing said arm into the full line position shown in Figure 6, thereby to open the discharge orifice 15, when the propulsion tube is initially rotated, as will subsequently be described. The cam face 33 serves to outwardly move the closure 16 from the discharge orifice 15 whereby said member may readily be swung to one side of the discharge orifice by the abutment shoulder 34 at the front end of the propulsion tube, as previously described.

The propulsion tube is shown comprising a plurality of diametrically opposed powder agitating fingers or prongs 35, preferably arranged in staggered relation as shown in Figures 2 and 3. A plurality of dust or powder circulating passages 36 are provided in the wall of the propulsion tube 14 adapted to register with similar openings 37 provided in the wall of a sleeve member, generally designated by the numeral 38. The sleeve member 38 is rotatably supported within the propulsion tube 14, and has its forward end abuttingly engaging an annular shoulder 39 in the bore of the propulsion tube. The rear end of the sleeve member is shown disposed in the plane of the rear end of the propulsion tube, as best illustrated in Figures 2 and 3.

The rear edge of the wall of the propulsion tube 14 is inwardly recessed as shown at 41 to receive the bar 24, whereby when the operating member 10 is relatively rotated upon the cylinder extension 5, rotary movement is subsequently imparted to the propulsion tube. The recesses 41 in the rear edge of the propulsion tube's wall are relatively wider than the bar 24, whereby rotary movement is not imparted to the propulsion tube 14 upon initial rotary movement of the operating member 10.

The rear end of the sleeve member 38 is also notched to receive the bar 24, as shown at 42 in Figure 5. The notches 42 provided in the end of the sleeve member 38 are, however, sized to substantially fit the bar 24, whereby when the operating member 10 is initially rotated, rotary movement is simultaneously imparted to the sleeve member 38.

The length of the resilient portion 8 of the clip 7, and the width of the recesses 41, are such as to prevent relative axial or reciprocal movement of the operating member 10 to operate the gun, until after the sleeve member 38 has been rotated sufficiently to bring its apertures 37 into registry with its corresponding apertures 36 in the wall of the propulsion tube, as shown in Figure 3, and indicated by the dotted line position of the bar 24 in Figure 5.

After the sleeve member 38 has been rotated to fully open the dust circulating passages in the walls of the propulsion tube and sleeve member, continued rotary movement of the operating member will impart relative rotation to the propulsion tube whereupon its prongs 35 will agitate the material contained in the annular powder chamber 43 of the cylinder, and thereby loosen up the material in the event it may have become more or less compacted therein.

The sleeve member 38 preferably has its wall longitudinally split as shown at 44 in Figure 3, and said wall is so fashioned that it constantly tends to expand to a relatively larger diameter than the bore of the propulsion tube, whereby the sleeve member will maintain substantially a leak-tight fit within the bore of the propulsion tube 14, as will be understood, by reference to Figures 1 and 2.

Another important feature of the present invention resides in the orientation and arrangement of the various parts of the apparatus, whereby the entire operation of the gun may be controlled by the simple manipulation of the operating member 10. This assures prompt action of the gun which is a highly desirable attribute in a powder gun of this general type.

Operation

When the gun is in the normal inoperative condition, as shown in Figure 2, the propulsion tube is so positioned with respect to the sleeve member 38 that the passages provided in the walls of the sleeve member and propulsion tube are closed to the flow of dust from the dust chamber 43 into the propulsion tube. The closure 19 at the front end of the gun will also be in sealing engagement with the end of the propulsion tube to prevent leakage from the discharge orifice 15, and the forward end of the operating member will be abuttingly engaged with the sealing element 28 seated against the end of the outer casing member 3 to prevent leakage at this point. Also when the parts are in their normal inoperative position, as above described, the bar 24 of the operating member 10 is interlocked with the resilient end portion 8 of the abutment clip 7, whereby the operating member cannot be reciprocated upon the cylinder extension 5, as previously stated.

To initially start the gun, the operator simply grasps the outer casing 3 with one hand and removes the gun from its supporting means, and with the other hand grips the end of the operating member and gives it a slight turn or twist in a clock-wise direction, when looking at the rear end of the gun. Such manipulation of the operating member 10 will effect the release of the operating member from the locking clip 8, and simultaneously open the dust circulating passages provided in the walls of the propulsion tube and sleeve member 38, whereby dust may freely enter the sleeve member 38 from the dust chamber 43, as will be readily understood by reference to Figures 2 and 3. Initial rotary movement of the operating member 10 on the cylinder will also cause the closure 16 to be swung to its open position as a result of being engaged by the abutment shoulder 34 at one end of the cams 33, as shown in full lines in Figures 1 and 6.

If the initial operation of the operating member indicates that the powder contained in the powder chamber 43 of the gun may be compacted therein, the operator simply continues to relatively rotate the operating member 10 whereby the propulsion tube is relatively rotated within the cylinder. Continued rotation of the propulsion tube will cause its fingers or prongs 35 to break up and agitate the compacted powder within the powder chamber 43 sufficiently to cause it to freely flow through the aligned apertures in the propulsion tube and sleeve member 38, into the sleeve member as the gun is operated. When the powder is thus agitated within the powder chamber, it may readily be discharged from the gun in adequate quantities to quickly smother and extinguish a fire, by the simple reciprocation of the operating member 10 upon the cylinder extension 5.

To support the gun in a position whereby it may be quickly and conveniently grasped, in the event of an emergency, an apertured lug 45 preferably is secured to the wall of the cylinder 2 by such means as rivets 46, shown in Figures 2 and 3, whereby the gun may readily be hung on a fixed hook or nail, or some other suitable support, when the gun is not in use. The bracket is shown having a rearwardly directed end portion 47 which may be laterally widened, as shown at 48, and formed with an inwardly directed flange 40 to provide an abutment for limiting inward movement of the operating member 10, when the latter has been manipulated to operate the gun.

In other words, when the operating member is initially rearwardly moved on the cylinder extension 5, the flange 40 of the resiliently supported head 48 of the bracket 45 drops into engagement with the periphery of the cylinder extension 5, into the path of the adjacent end of the operating member 10, thereby to limit the inward or forward movement of the operating member so that its end wall 23 and locking bar 24 will not impinge against the end of the propulsion tube and restrict free circulation of powder into and out of the interior of the operating member 10, when the gun is in operation.

The provision of the prongs or fingers 35 in the powder chamber 43, and the arrangement of the apertures in the walls of the propulsion tube and the sleeve member 38, and also the relationship between the rear end of the propulsion tube and the locking clip 8, assures the operator that there is little danger of the powder or dust in the cylinder becoming compacted therein to the extent that the operation of the gun may become impaired.

All fresh air drawn into the gun enters through the discharge orifice 15 upon the suction strokes of the operating member 10. Such inrush of fresh air through the discharge orifice disperses the powder in the sleeve member 38 and propulsion tube 14, and some air and powder may enter the interior of the operating member 10 when rearwardly reciprocated upon the cylinder extension 5, as the rear end of the propulsion tube is then wide open to the interior of the operating member.

When the operating member is thrust forwardly on the compression stroke to discharge powder from the gun, the air drawn into the propulsion tube 14 and operating member 10 during the suction stroke is momentarily compressed in the propulsion tube whereby a mixture of air and powder is discharged from the gun through the discharge orifice 15, and at the same time a portion of the air and powder is forced through the aligned passages 36 and 37 in the sleeve 38 and tube 37, into the dust compartment 43. Then on the succeeding suction stroke, air and powder is drawn into the sleeve 38, while fresh air is drawn thereinto through the open discharge orifice 15, which will intermix with the air and powder in the propulsion tube.

Thus the constant rush of air into and out of the discharge orifice 15 will under all normal operating conditions keep the powder thoroughly dispersed in the air within the gun, whereby a full charge of powder is discharged from the gun upon each pressure stroke of the operating member 10.

*Fracturable sealing means, Figures 9 through 18*

In these figures, there is shown a gun comprising a cylinder 49 provided at its forward end with a suitable closure 51 having a marginal edge portion similar to the closure 9, shown in Figures 2 and 3, whereby it may be frictionally pressed into the open end of the cylinder, as shown and described with reference to Figures 10 and 11. The closure 51 is shown having its central portion depressed to provide a recess 52, the purpose of which will subsequently be described.

The cylinder 49 is provided at its opposite or rear end with an end wall 53 which is preferably fixed to the cylindrical wall of the cylinder by suitable means such as indicated at 54. If desired, the end wall 53 may be made integral with the cylindrical wall of the cylinder.

*Operating member*

An operating member, generally designated by the numeral 55, is mounted for reciprocal movement on the cylinder extension 56, and is shown having an L-shaped bracket 57 secured to the end wall 58 thereof. One end of the bracket projects through a slot in the end wall 58, as shown at 59, and extends inwardly through a slot 61 provided in the end wall 53 of the cylinder, when the operating member 55 is in its normal inoperative position, as shown in Figure 10.

An annular member 62 is fitted onto the intermediate portion of the cylinder 49 and is secured thereto by suitable means, not shown. A similar annular member 63 is secured to the cylinder 49 adjacent to its forward end. When the operating member is in its normal inoperative position, as shown in Figure 10, its inner or forward end will be spaced from the adjacent end of the annular member 62. A sealing strip 64 preferably in the form of an adhesive tape, is applied over the gap between the operating member 55 and the adjacent end of the annular member 62, thereby to prevent any possible danger of moisture entering the gun at this particular point, and also to prevent powder or dust from escaping from the interior of the gun through this joint as a result of rough handling. The sealing strip 64 also secures the operating member against relative movement upon the cylinder extension 56, when the gun is being handled or transported from one place to another.

*Powder agitating means*

The gun shown in Figures 10 and 11 comprises a powder agitating means in the form of a propulsion tube 65, similar to the propulsion tube 14 shown in Figures 2 and 3. One end of the propulsion tube 65 is supported in a centrally disposed enlarged aperture 66 provided in the closure 51 of the cylinder, and its opposite end is similarly supported in an enlarged aperture 67 provided in the end wall 53 of the cylinder. Annular flanges or collars 68 and 69, respectively, prevent longitudinal movement of the propulsion tube 65. Both ends of the propulsion tube are open.

A plurality of powder circulating passages 71 are provided in the wall of the propulsion tube and are adapted to register with similar openings 72 provided in the wall of a sleeve member 73, mounted for relative rotation within the propulsion tube 65 to control the flow of powder between the powder chamber 74 within the cylinder 49, and the interior of the propulsion tube and sleeve member 65 and 73, respectively, as in the pump illustrated in Figures 1 through 8.

The sleeve member 73 is provided at its forward end with a disk-like head 75 shown provided with a discharge orifice 76. The disk-like head 75 is secured to the sleeve member 73 for direct movement therewith. This may readily be accomplished by providing opposed notches 77 in the periphery of the disk 75 adapted to receive lugs 78 formed on the end of the sleeve member 73, and which lugs have their terminals bent over the outer face of the disk-like member 75, as shown at 79 in Figures 14 and 15, whereby the sleeve member 73 and a disk 75 become in effect an integral unit.

Opposed radial extensions 81 are formed on the periphery of the disk 75 which normally are positioned as shown in Figure 14. A puncturable sealing disk 82 is shown adhered to the outer surface of the closure 51 of the cylinder to seal the discharge orifice 76 and also the depression 52 against leakage, when the gun is handled in transit prior to having been used. Before the operating member 55 of the gun can be manipulated to operate the gun, the annular sealing tape or strip 64 must be broken or severed circumferentially, and in like manner the sealing disk 82 at the front end of the gun must have its central portion severed from its marginal edge to open the discharge orifice 76.

*Seal breaking means*

The means provided for thus breaking the seals 64 and 82 to render the gun operable for use, is shown comprising an outer cylindrical member, generally designated by the numeral 83, mounted for limited sliding or reciprocal movement upon the cylinder 49. The rear end portion of the member 83 is shown slidably supported on the annular member 62 of the cylinder and its forward end is shown similarly supported on the annular member 63 secured to the front end of the cylinder. To limit reciprocal movement of the outer cylindrical member 83, a relatively shorter cylindrical member 84 is fitted into the member 83 and fixedly secured therein. The overall length of member 84 is less than the spacing between the adjacent ends of the annular members 62 and 63, as may be noted at 85 in Figure 10, whereby the opposed ends of the inner member 84 will alternately engage the annular members 62 and 63 and thereby limit the relative axial movement of the member 83 on the cylinder 49, when manipulating the seal breaking or severing means. In Figure 10, the outer casing member 83 is shown in its foremost position, assumed when the gun is initially loaded or charged with powder. The member 83, including the inner member 84 is also mounted for rotary movement upon the cylinder 49, which movement controls the longitudinal or reciprocal movement of the member 83.

Secured to the forward end of the outer casing member 83 and overlying the front end closure of the cylinder 49 is a member 86 comprising diametrically opposed radial arms 87 and 88 having rearwardly extending portions 89 and 91, respectively, as best shown in Figures 10 and 11. The rearwardly extending end portions 89 and 91 are suitably secured to the forward end of the outer casing 83, whereby the member 86 becomes in effect an integral part of the outer member 83. The body of the member 86 is preferably annular in configuration, as illustrated in Figure 14, to provide an enlarged aperture or opening 92 through which the sealing element or disk 82 may be seen.

Inwardly directed cutting elements 93 are provided on the member 86 which normally are positioned over the sealing disk 82 covering the discharge orifice 76 in the disk-like head 75 of the sleeve member 73. The cutting terminals of the elements 93 are disposed substantially in registry with the annular gap 94 provided between the periphery of the head 75 and the cylindrical wall of the recess 52, as clearly illustrated in Figure 10.

When the parts are in their normal positions, as shown in Figures 10 and 14, the cutting elements 93 of the member 86 cannot accidentally engage the sealing disk 82 because of inwardly directed diametrically opposed lugs 90 shown integrally formed on the member 86 and positioned over the opposed extensions 81 of the head 75, as best shown in Figure 14.

Thus, before the disk 82 can be severed, it is necessary that the casing member 83 be relatively rotated upon the cylinder 49 to move the cutting terminals 93 out of registry with the projecting portions or lugs 81 of the head 75, as will subsequently be described.

A cutting element, generally designated by the numeral 95, is provided on one end of a resilient arm 96 formed on one end of a strap-like member 97 having its major portion received in a guide 98 shown integrally formed in the wall of the outer casing 83, as best illustrated in Figures 11 and 17. By thus supporting the member 97, it is movable circumferentially on the main cylinder 49, when the outer member 83 is relatively rotated thereon. The rear resilient arm 96 of the strap member 97 is inclined upwardly away from the cylinder whereby its cutting terminal 95 is out of engagement with the annular sealing strip 64, as shown in Figure 10. The cutting terminal 95 is normally positioned over the sealing strip 64 which seals the annular gap provided between the shoulder 99 and the adjacent end of the operating member 55, as illustrated in Figures 10 and 11.

A member 101 has one end fixedly secured to the outer tubular member 83 and has an inclined portion 102 functioning as a cam to engage the resilient arm 96 and force it downwardly when the casing member 83 is relatively moved rearwardly on the main cylinder 49. Such depression of the resilient arm 96 will cause its cutting terminal 95 to engage and puncture the sealing strip 64, whereby when the casing member 83 is relatively rotated upon the cylinder, the sealing strip is severed in a circumferential direction to release the operating member 55 for operation. The element 101 has its rear end bent downwardly, as shown in Figures 10 and 11, and serves to provide a protection for the cutting element 95.

The guide 98 it will be noted by reference to Figures 10 and 11, does not extend the full length of the outer casing member 83, but extends through an aperture 103 provided in the wall of the casing 83. The strip 97 passes through the opening 103 in the casing 83 and over the wall portion 110 of the outer casing 83, and thence through another opening 104 provided in said casing and has its end bent around the flange of the closure 51, as indicated at 105, whereby the member 86 may be moved inwardly with the casing member 83, thereby to bring the cutting elements 93 into engagement with the sealing disk 82 to sever it and open the discharge orifice 76.

*Cam means for actuating outer casing 83*

The means provided for longitudinally translating the outer casing member 83 upon the cylinder 49 is shown comprising a protruding cam 106 formed on the forward edge of the member 84 fitting within and secured to the wall of the outer member 83, as best illustrated in Figure 12. In its non-operative position, the cam 106 is received in a recess 107 provided in the adjacent edge of the annular member 63 secured to the forward end of the cylinder 49. The outer casing member 83 is normally in its forward position as shown in Figure 10, and when it is desired to render the gun operative to discharge or spray powder onto a fire or other object, the operator simply grasps the casing member 83 with one hand and the operating member 55 with his other hand and relatively rotates the casing 83 upon the cylinder.

Such manipulation of the casing 83 will cause the cam 106 to leave the recess 107 in the edge of the member 63, whereby the outer tubular member 83 is axially moved in a direction towards the right, when viewed as shown in Figures 10 and 11, whereby the inclined portion 102 of the member 101 will force the cutting element 95 into cutting engagement with the sealing strip 64. At the same time the cutting elements 93 at the forward end of the gun are moved into cutting engagement with the disk 82 whereby the central portion of said disk is removed, thereby to open the discharge orifice 76 to permit the powder to be freely discharged from the gun by manipulation of the operating member 55.

An important feature of the structure resides in the provision of the lugs 90 on the end member 86. When the outer tubular member 83 is initially relatively rotated upon the cylinder from the position shown in Figure 10 to the position shown in Figure 11, the lugs 90 are moved out of registration with the outwardly projecting portions 81 of the head 75 of the sleeve 73, and at the same time the lugs 90 are axially moved in a direction towards the butt end of the gun, into driving engagement with the projections 81 whereby the sleeve 73 is rotated simultaneously with the outer member 83. Initial rotation of the sleeve 73 relative to the propulsion tube 65, will bring the apertures 72 in the sleeve into registration with the apertures 71 in the wall of the propulsion tube, as shown in Figure 11. Such registration of the apertures 72 and 71 is controlled by the length of the recesses 100 provided in the forward edge of the propulsion tube 65.

When the projections 81 engage the ends of the recesses 100 in the propulsion tube, the propulsion tube will turn or rotate simultaneously with the sleeve 73, thereby causing its fingers or prongs 35 to loosen and agitate the powder in the chamber 74, should it have become compacted therein. The powder may then flow freely through the aligned apertures 71 and 72 into the sleeve 73, as will be understood.

During operation of the operating member of the gun, fresh air is constantly being drawn into the sleeve and propulsion tube, at each suction stroke, through the discharge orifice at the front end of the main cylinder. At the same time, a portion of the mixture of air and powder in the powder chamber in the main cylinder is drawn into the sleeve through the aligned apertures in the walls of the sleeve and propulsion tube, and become thoroughly intermixed with the powder-filled air in the sleeve. The operator is thus assured that a maximum quantity of powder is discharged from the gun onto the fire or other object, each time the operating member is thrust forwardly.

When the outer tubular member 83 is returned to its normal forward position with its cam 106 received in the recess 107, the driving lugs 93 on the front member 86 are moved out of driving engagement with the projections 81 on the head 75 of the sleeve. Such return of the outer tubular member 83 to its normal position will also cause the sleeve to relatively rotate within the propulsion tube and return to its normal position, shown in Figure 10, and at the same time the driving lugs 90 and the end member 86 are returned to their normal positions over the projections 81 on the head 75 of the sleeve 73.

The entire apparatus is very simple and inexpensive in construction, and all of its parts readily lend themselves to manufacture in quantity production, whereby the gun may be produced at very low cost. It may be made of any desired material suitable for the purpose. Paper, or more specifically, cardboard, has been found very efficient and practical, and may readily be waterproofed to render it immune from water and moisture, which is essential in order that the powder within the gun will not become so compacted or solidified as to render the gun inoperative.

A dust gun designed for extinguishing fires, and the like, must always be ready for instant use. The novel gun herein disclosed embodies all of the desirable features desired in such a gun. Its sealing means are so constructed and arranged that they may be instantly broken or severed by a slight rotary movement of the operating member upon the main cylinder, whereby the gun may be rendered ready for immediate use without loss of time; it is extremely simple to operate and each stroke of the operating member will assure a maximum charge of powder because of the turbulence of the air and powder within the propulsion tube and powder chambers; its unique construction also permits it to be operated at any desired angle with equal results which is of extreme importance in a dust gun or sprayer designed for use in extinguishing fires; and because of its inexpensive construction, it may be discarded or disposed of immediately following use, if so desired. On the other hand, it may be quickly recharged and resealed for storage by simply applying new sealing elements 64 and 82 thereto, whereby the gun, loaded with powder, may be stored away in readiness for use at some future time.

In the accompanying drawings and in the foregoing, there is disclosed a dust gun comprising a propulsion tube which is mounted for relative rotary movement in the end walls of the cylinder, and having a sleeve rotatably supported therein for controlling circulation through the apertures in the walls of the propulsion tube. If desired, the propulsion tube could be fixedly mounted within the cylinder and the sleeve 38 in Figure 2, or 73 in Figure 10, could be eliminated whereby it would be possible to greatly reduce the cost of the pump which in some instances might be desirable to meet competition and to provide such a structure which could be sold to the trade at a very low price.

The dispersion of the powder in such a simplified gun would be very similar to the dispersion of the powder in the guns illustrated in Figures 2 and 10 when its operative member is manipulated. The construction of the above described simplified form seems obvious and it is therefore deemed unnecessary to illustrate the same in the drawings.

It will be apparent to those skilled in the art that I have accomplished at least the principal objects of my invention, and it will also be apparent to those skilled in the art that the embodiments herein described may be variously changed and modified without departing from the spirit of the invention, and that the invention is capable of uses and has advantages not herein specifically described; hence it will be appreciated that the herein disclosed embodiments are illustrative only, and that my invention is not limited thereto.

I claim as my invention:

1. In an apparatus of the class described, a cylinder having suitable end walls, an axially disposed tubular member extending lengthwise through the cylinder and having its ends supported for rotation on the cylinder end walls, said tubular member cooperating with the walls of the cylinder to provide a concentric powder chamber therebetween, a plurality of apertures in the wall of the tubular member for establishing communication between the interior thereof and the powder chamber, a discharge orifice at one end of the tubular member, and an expansible operating member, said tubular member forming a discharge and intake into said expansible operating member.

2. An apparatus according to claim 1, wherein means within the apparatus is provided for locking the expansible operating member in its normal inoperative position, when the apparatus is not in use.

3. In an apparatus of the class described, a cylinder having suitable end walls, a rotatable, axially disposed tubular member extending lengthwise through the cylinder and cooperating with the walls of the cylinder to provide a powder chamber therebetween, a plurality of apertures in the wall of the tubular member for establishing communication between the interior thereof and the powder chamber, a discharge orifice at one end of the tubular member, and an operating member telescopingly mounted on the cylinder and forming a pump chamber adapted upon movement in one direction, to draw fresh air into said tubular member through the discharge orifice, and when moved in the opposite direction, said operating member will discharge a blast of powder from the gun through the discharge orifice.

4. In an apparatus of the class described, a cylinder provided with suitable end walls, an axially disposed tubular member extending lengthwise through the cylinder and having its ends rotatably supported in the cylinder end walls, said member cooperating with the walls of the cylinder to provide a powder chamber, a discharge orifice at one end of the tubular member, means normally closing the discharge orifice, a plurality of dust circulating passages in the wall of said tubular member for establishing communication between the interior of the tubular member and the powder chamber, an expansible operating member telescopingly mounted on one end of the cylinder forming a pump chamber adapted for reciprocal movement thereon, said pump chamber being connected to atmosphere through said tubular member, movement of said operating member in one direction drawing fresh air into the tubular member, and when moved in the opposite direction, said member will cause a portion of said air to enter the powder chamber and disperse the powder therein, thereby to facilitate the discharge of powder from the gun through the discharge orifice.

5. An apparatus according to claim 4, wherein rotatable means is provided on the apparatus whereby initial movement of the operating member opens the discharge orifice.

6. In an apparatus of the class described, a cylinder having suitable end walls, an axially disposed tubular member mounted for rotation, extending lengthwise through the cylinder and cooperating with the walls of the cylinder to provide an annular powder chamber therebetween and extending substantially the length of the cylinder, powder circulating passages in the wall of said tubular member for establishing communication between the interior thereof and the powder chamber, a discharge orifice in an end wall of the cylinder in direct communication with the tubular member, and an operating member telescopingly mounted on the cylinder and forming a pump chamber adapted for reciprocal movement thereon, said pump chamber being connected to atmosphere through said tubular member, movement of said operating member in one direction causing a supply of fresh air to be drawn into the tubular member and simultaneously powder is drawn into said member from the powder chamber through the powder circulating passages in the wall of said tubular member and when the operating member is moved in the opposite direction, powder is discharged from the gun through the discharge orifice and simultaneously a pressure is developed in the powder chamber to thoroughly disperse the powder therein.

7. An apparatus according to claim 6, wherein means forming a part of said apparatus is provided for sealing the discharge orifice and securing the operating member against movement, when the apparatus is not in use.

8. In a powder gun of the class described, a cylinder having suitable end walls, a tubular member extending lengthwise through the cylinder and mounted for relative rotatable movement therein, said tubular member cooperating with the walls of the cylinder to provide an annular powder chamber, a discharge orifice at the forward end of the tubular member, means for normally closing the discharge orifice, the wall of said tubular member being apertured for establishing communication between the interior thereof and the powder chamber, an expansible operating member mounted on said cylinder for rotary and reciprocating movement, said tubular member forming a discharge and intake into said expansible operating member, an operative rotary connection between said expansible operating member and the discharge orifice closure, whereby initial rotary movement of said member opens the discharge orifice and reverse movement closes said orifice.

9. A powder gun according to claim 8, wherein cooperating means are provided on the expansible operating member and said cylinder adapted to lock said expansible operating member against expanding movement when the expansible operating member is in non-expanded position and rotated in one direction, whereby initial rotary movement of the expansible operating member will unlock said expansible operating member for expanding movement thereof.

10. A powder gun according to claim 8, wherein means is provided on the periphery of the tubular member for agitating the powder in the powder chamber, when the operating member is relatively rotated upon initial starting of the gun.

11. In a powder gun of the class described, a cylinder having suitable end walls, a propulsion tube extending lengthwise through the cylinder and having its ends rotatably supported in the end walls of the cylinder, said propulsion tube cooperating with the walls of the cylinder to provide a powder chamber and having a plurality of powder circulating passages in its walls for establishing communication between the interior thereof and the powder chamber, a sleeve member rotatably fitting within the propulsion tube and having a plurality of fluid circulating passages in its wall adapted to be moved into or out of registration with the passages in the wall of the propulsion tube by relative rotation within the propulsion tube, thereby to control circulation between the powder chamber and the sleeve member, a discharge orifice at the forward end of the sleeve member, a closure normally sealing said orifice, an operating member telescopingly mounted on the rear end portion of the cylinder and adapted for reciprocal movement thereon to draw air into the gun through the disharge orifice during its suction stroke, and to discharge powder from the gun through said orifice upon its compression stroke, and means whereby initial relative rotary movement of the operating member on the cylinder opens the discharge orifice closure and simultaneously opens the passages in the walls of the propulsion tube and sleeve member.

12. In a powder gun of the class described, a cylinder having suitable end walls, a propulsion tube extending lengthwise through the cylinder and having its ends rotatably supported in the end wall of the cylinder, said propulsion tube co-operating with the walls of the cylinder to provide a powder chamber, and having a plurality of powder circulating passages in its wall for establishing communication between the interior thereof and the powder, a sleeve member rotatably fitting within the propulsion tube and having a plurality of fluid circulating passages therein adapted to be moved into or out of registration with the passages in the wall of the propulsion tube by relative rotation of the propulsion tube, thereby to control circulation between the powder chamber and the sleeve member, a discharge orifice at the forward end of the sleeve member, a pivoted closure normally sealing said orifice, an operating member telescopingly mounted on the cylinder and adapted for reciprocal movement thereon to draw air into the gun through the discharge orifice during its suction stroke and to discharge powder from the gun upon its compression stroke, cooperating means on the operating member and propulsion tube, whereby initial relative rotary movement of the operating member on the cylinder opens said discharge orifice closure.

13. A powder gun according to claim 12, wherein the propulsion tube is provided with a plurality of radial fingers adapted to engage the powder in the powder chamber, and loosen it, should it become compacted therein when the gun is not in use.

14. In a powder gun of the class described, a cylinder having suitable end walls, one of which may serve as a cover for the cylinder to facilitate introducing powder therein, a propulsion tube mounted within the cylinder and having its ends supported in the end walls of the cylinder, said tubular member cooperating with the walls of the cylinder to provide a powder chamber and having a plurality of powder circulating passages in its wall for establishing communication between the powder chamber and the interior of said propulsion tube, a sleeve member rotatably fitting within the propulsion tube and having a plurality of apertures in its wall adapted to be moved into or out of registration with the passages in the wall of the propulsion tube, said sleeve member having a head at its forward end provided with a discharge orifice, a sealing element normally closing said orifice against moisture and leakage, a casing rotatably supported on the forward end portion of the cylinder and adapted for limited axial movement thereon, said casing having an end member overlying the front end wall of the cylinder and normally axially spaced from the sealing element for the discharge orifice, cutting elements carried by said end member and normally positioned adjacent to said sealing element, inwardly projecting driving lugs on said end member adapted to engage means on the head of the sleeve member, upon rearward axial movement of said casing upon the cylinder, and cam means for axially translating said casing upon the cylinder upon initial starting of the gun, whereby the cutting elements are moved into cutting engagement with the sealing element to sever it and open the discharge orifice.

15. In a powder gun of the class described, a main cylinder having a rear end wall fixed thereto and having a detachable front wall to facilitate loading the gun, a sealing element normally closing said orifice, a propulsion tube within the cylinder having means connected thereto for causing an agitation of the powder within the cylinder when the pump is operated, a sleeve member within the propulsion tube provided at its forward end with a suitable head having a discharge orifice therein, an operating member telescopingly mounted at the rear end of the cylinder and adapted for reciprocal movement thereon, an annular shoulder on the periphery of the cylinder spaced from the forward end of the operating member to provide an annular gap therebetween, when the operating member is in its normal inoperative position, a sealing strip or tape closing the gap between said shoulder and the adjacent end of the operating member, a casing rotatably supported on the forward end of the cylinder and having an end member overlying the front wall of the cylinder, cutting elements secured to said end member and normally spaced from said sealing element, driving lugs also carried by said end member adapted to operatively engage the sleeve head to relatively rotate said sleeve member, a spring supported cutting element normally positioned over said annular sealing strip, and cam means for axially translating the casing on the front end of the cylinder when relatively rotated thereon, thereby to cause the cutting elements on the front end member of said casing to engage the sealing element and sever it to open the discharge orifice, such rearward axial movement of said casing upon the cylinder also causing said resiliently supported cutting element to be forced into cutting engagement with the sealing strip, thereby to sever said strip and release the operating member.

16. In a powder gun of the class described, a cylinder having suitable end walls, one of which may serve as a cover for the cylinder to facilitate introducing powder therein, a propulsion tube mounted within the cylinder and having its ends supported in the end walls of the cylinder, said tubular member cooperating with the walls of the cylinder to provide a powder chamber and having a plurality of powder circulating passages in its wall for establishing communication between the powder chamber and the interior of said propulsion tube, a sleeve member rotatably fitting within the propulsion tube and having a plurality of apertures in its wall adapted to be moved into or out of registration with the passages in the wall of the propulsion tube, said sleeve member having a head at its forward end provided with a discharge orifice, a sealing element normally closing said orifice against moisture and leakage, a casing rotatably supported on the forward end portion of the cylinder and adapted for limited axial movement thereon, said casing having an end member overlying the front end wall of the cylinder and normally axially spaced from the sealing element covering the discharge orifice, cutting elements carried by said end member and normally positioned adjacent to said sealing element, inwardly projecting driving lugs on said end member adapted to engage means on the head of the sleeve member, upon rearward axial movement of said casing upon the cylinder, means for axially translating said casing upon the cylinder upon initial starting of the gun, whereby the cutting elements are moved into cutting engagement with the sealing element, an operating member mounted for reciprocal movement on the rear end portion of the cylinder to alternately draw air into the gun and discharge powder therefrom, and a locking device carried by the operating member adapted to interlock with the adjacent end wall of the cylinder, when the operating member is in its normal inoperative position, whereby the cylinder and outer casing may be relatively rotated to cause the cutting elements to sever the sealing element.

17. A powder gun according to claim 16, wherein means is provided on the movable casing for limiting forward movement of the operating member, when manipulated to discharge powder from the gun.

18. In a powder gun of the class described, a powder storage chamber, a relatively rotatable tubular member extending substantially through said powder storage chamber, a plurality of powder agitating extensions integral with said tubular member and projecting into said powder storage chamber, a telescopically mounted operating chamber, cooperative associated projections on said operating member and said tubular member, whereby initial rotary motion of said operating member agitates the powder in the powder chamber.

19. In a powder dispensing container, a relatively rotatable longitudinally disposed member passing substantially through a powder storage portion of the container, said longitudinal member being provided with a plurality of integral powder agitating extensions projecting into said powder storage portion of the container, a rotatable outer portion of the container, means whereby initial relative rotary motion of the said outer portion of the container agitates the powder in said powder storage portion of the container.

20. In an apparatus of the class described, a cylinder having suitable end walls, a rotatable, axially disposed tubular member extending lengthwise through the cylinder and cooperating with the walls of the cylinder to provide a powder chamber therebetween, a plurality of apertures in the wall of the tubular member for establishing communication between the interior thereof and the powder chamber, a discharge orifice at one end of the tubular member, and an operating member telescopingly mounted on the cylinder and forming a pump chamber adapted upon movement in one direction, to draw fresh air through the discharge orifice and tubular member into said pump chamber for thorough intermixing of air and powder before each compression stroke of said member, and when moved in the opposite direction, said operating member will discharge a blast of powder from the gun through the discharge orifice.

GEORGE B. MORNIK.

REFERENCES CITED

The following references are of record in the file of this patent:

UNITED STATES PATENTS

| Number | Name | Date |
| --- | --- | --- |
| 2,068,978 | Erwin | Jan. 26, 1937 |
| 2,215,937 | Rutkowski | Sept. 24, 1940 |
| 2,315,581 | Berenson | Apr. 6, 1943 |